United States Patent

Hocker et al.

[11] Patent Number: 5,943,678
[45] Date of Patent: Aug. 24, 1999

[54] TEMPORAL DISPLACEMENT ICON IN A GRAPHICAL USER INTERFACE

[75] Inventors: Michael David Hocker, Staatsburg, N.Y.; Gregory Tad Kishi, Oro Valley, Ariz.; James Gordon Mc Lean, Fuquay-Varina, N.C.; Clifford Alan Pickover, Yorktown Heights, N.Y.; Daniel James Winarski, Tucson, Ariz.

[73] Assignee: International Business Machines Corporation, Armonk, N.Y.

[21] Appl. No.: 08/760,152

[22] Filed: Dec. 3, 1996

[51] Int. Cl.⁶ .................................................. G06F 15/00
[52] U.S. Cl. .................................... 707/511; 345/349
[58] Field of Search .................... 707/511, 526, 707/529, 530, 101, 501; 345/348, 349, 146, 140

[56] References Cited

U.S. PATENT DOCUMENTS

| | | | |
|---|---|---|---|
| 4,899,292 | 2/1990 | Montagna et al. | 707/501 |
| 5,220,657 | 6/1993 | Bly et al. | 395/425 |
| 5,233,687 | 8/1993 | Henderson, Jr. et al. | 395/158 |
| 5,261,040 | 11/1993 | Suzuki | 345/146 |
| 5,371,851 | 12/1994 | Pieper et al. | 395/164 |
| 5,412,769 | 5/1995 | Maruoka et al. | 395/140 |
| 5,561,758 | 10/1996 | Hocker et al. | 395/159 |
| 5,732,155 | 3/1998 | Saito | 382/232 |
| 5,757,372 | 5/1998 | Krause et al. | 345/348 |

*Primary Examiner*—Mark R. Powell
*Attorney, Agent, or Firm*—Robert M. Sullivan

[57] ABSTRACT

This invention permits users to conveniently examine functions, applications, data, and other parameters for different periods of time. A region of the graphical user interface is provided to which other icons may be dragged so that the function represented by the dragged icon returns to a prior state or is extrapolated to a future state. By storing the previous m versions of a file, application, database, etc., where m is user selectable, the user can review prior versions of that file, application, or database without explicitly having to track those versions. The graphical nature of the present invention provides a significantly more intuitive way to manipulate the time.

22 Claims, 3 Drawing Sheets

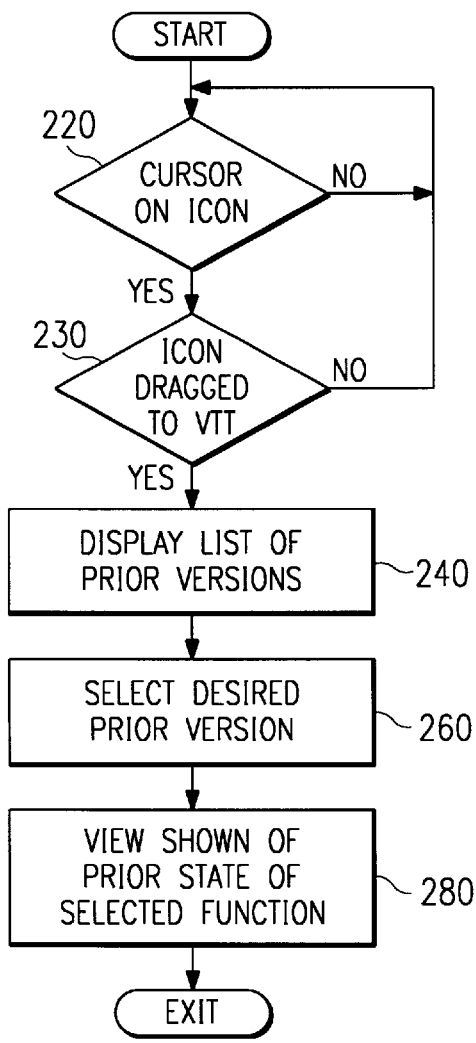
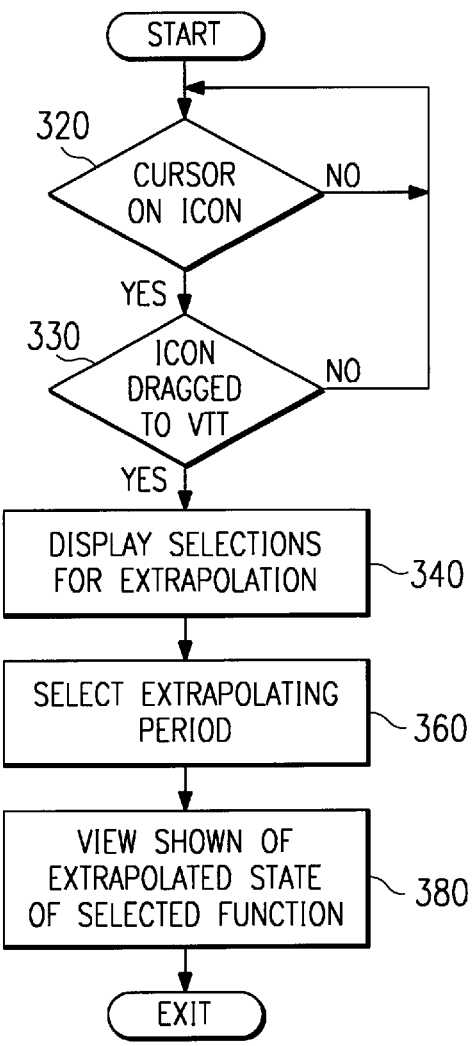

5,943,678

TEMPORAL DISPLACEMENT ICON IN A GRAPHICAL USER INTERFACE

FIELD OF THE INVENTION

This invention relates to applications accessed or controlled by graphical user interfaces, GUIS. More specifically, the invention relates to a region of a GUI to which other icons may be dragged so that the application, database, displayed information or other function represented by the dragged icon returns to a prior state or is extrapolated to a future state.

BACKGROUND OF THE INVENTION

Graphical user interfaces (GUIS) provide ways for users of computers and other devices to effectively communicate with a computer. In GUIs, available applications and data sets are often represented by graphical images such as icons and windows which the user can directly manipulate and select, rather than have to manually type a command to initiate a program. Icons are on-screen symbols that simplify access to a program, command, or data file and are usually activated by moving a mouse-controlled cursor onto the icon and pressing a button or key.

GUIs include graphical images on computer monitors. A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Users of GUIs often would like to examine functions, applications, data, and other parameters for different periods of time. Currently this feature is not part of a standard GUI interface. However, by use of software that manages various file versions, for example the IBM High Performance Optical File System (HPOFS) with a novel GUI interface, access can now be gained to versions of functions, applications, databases, displayed information, files, etc. HPOFS stores versions of files, such as databases and application outputs, on write-once (WORM) optical media. A derivative of this file system could also be applied to Compact-Disk Recordable (CD-R) media, which is also write once. Write-once media cannot be overwritten, which makes it ideal for retaining unalterable versions of files. Alternately, versions of files can be stored on any other form of media, such as hard disk, magnetic or optical tape, floppy disk, magneto-optical (MO), phase-change (PC), CD-Erasable (CD-E), digital video/versatile disks (DVD), etc.

OBJECTS AND SUMMARY OF THE INVENTION

In view of the foregoing, it is an object of the present invention to provide an improved system and method for retrieving prior versions of an application, database, or other function. A target GUI becomes a front-end for version storing software, such as HPOFS.

It is another object of this invention to provide an improved system and method for extrapolating versions of databases or other functions into the future.

These and other aspects are achieved in this invention by permitting users to conveniently examine functions, applications, data, and other parameters for different, non-current periods of time. A region of the graphical user interface is dedicated to which other icons may be dragged so that the application, database, or other function represented by the dragged icon returns to a prior state or is extrapolated to a future state.

The foregoing and other objects, features, and advantages of the invention will be apparent from the following more particular description of a preferred embodiment of the invention, as illustrated in the accompanying drawings.

BRIEF DESCRIPTION OF THE DRAWINGS

FIG. 2 is a flow chart of the steps of one algorithm of the present invention for returning to a prior state an application, database, displayed information, or other function;

FIG. 3 is a flow chart of the steps of another algorithm of the present invention for extrapolating a database, information or other function into the future.

DETAILED DESCRIPTION OF THE INVENTION

Figure 1:
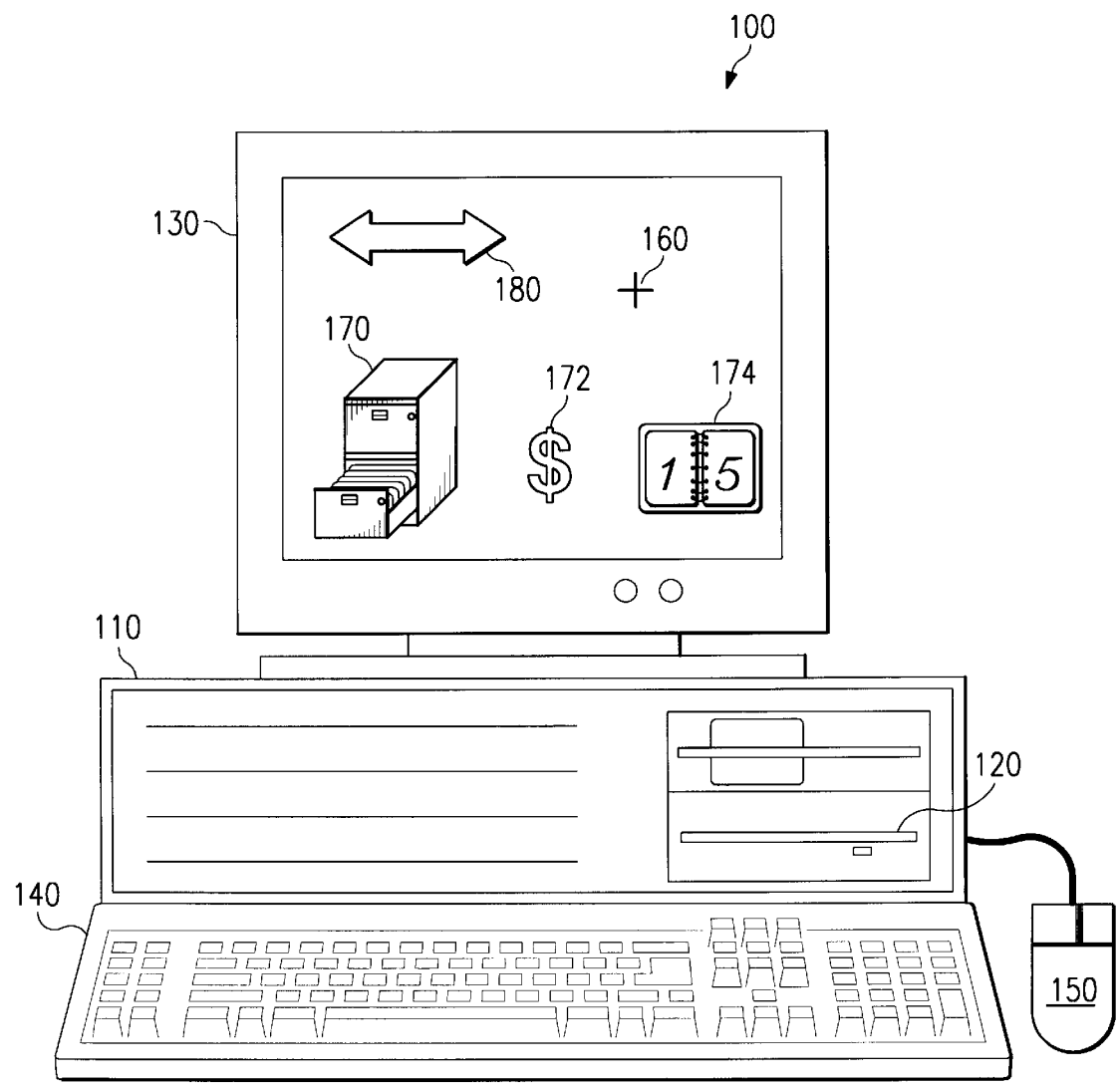
FIG. 1 represents a computer system in which the present invention is incorporated.

The present invention is capable of running on any general purpose computer system or computer controlled GUI (e.g., a television or virtual reality system). A system in which the present invention is incorporated is schematically represented in the block diagram of FIG. 1. A computer system 100 comprises a central processing unit (CPU) 110, a memory storage device 120 (such as a hard disk, tape or optical drive, whether locally or networked/remotely connected), a monitor or graphical interface 130, a keyboard 140 and a selection device such as a mouse 150. In some environments, the CPU 110 can be connected through a network adaptor to a network (not shown). The mouse 150 is used to move an on-screen cursor 160 to select GUI objects, such as application icons 170, 172 and 174. An additional icon 180 serves as the virtual time tunnel (VTT) target icon.

The VTT icon 180 may have a distinct graphical representation, such as an icon, or it may instead be a dedicated region of the graphical user interface with no distinguishing graphical characteristics.

In one embodiment, a user uses the cursor 160 in a known manner to drag an icon 172 representing a database of, for example, financial transactions, on top of the VTT icon 180. The contents of the database from a selected prior period of time, stored in the memory device 120, are accessed and displayed on the screen. Present data in the database are not altered or replaced by the earlier data; rather, the user is allowed to examine older versions of the data without confusing older data with present data. Graphical methods, such as shading or coloring, may be used to visually differentiate retrieved and/or extrapolated displays from current displays.

Referring now to the flow chart of FIG. 2, if the cursor 160 directed by the mouse or other selection means 150 is placed over a source icon, step 220, then step 230 determines whether the source icon has actually been selected and dragged to the VTT icon 180. If it is determined, using geometrical calculations known to those skilled in the art, that the source icon was dragged to the VTT icon 180, then in step 240 a list of prior versions, sorted for example by date, of the application, database, or other information (hereinafter collectively referred to as the "function") represented by the source icon is displayed. The user selects a desired prior version in step 260 and the selected function is then accessed and shown in a prior state in step 280

In another embodiment, a "looking glass-like" tool can be used when the VTT 180 is moved to the source material to temporarily turn a selected portion (or the entirety) of the current version of a function into a prior version of the function, when the tool is held over that portion of the selected file.

Write-once (WORM) optical disks maintain previous versions of files when using the IBM High Performance Optical File System (HPOFS-WORM). When the memory device 120 includes a WORM drive and media, the VTT icon 180 can be adapted for use with the WORM storage media and associated version-storing software. (When WORM optical media is used to store the versions, no changes are needed to the operating system as the data file is stored as a new version each time it is saved to the write-once optical media.) Thus, the previous versions of each file are always accessible. The VTT icon 180 directs the system 100 to look for the version of a file stored at a specified time or to look for a specified i-th previous version of the desired file as directed by the user, all stored under the same file name.

The time period to look back to may be set by the system or by application software using a stored user profile. Alternatively, the user may interactively set the VTT's time coordinates using a graphical representation, or data-entry field, positioned in the graphical user interface, preferably near the VTT 180. The graphical representation may be a gauge, slider, dial, or other graphical controller. For some functions, the desired version can be selected from a list of available (stored) prior versions, rather than being selected by date.

Assuming the current data to be version n, the VTT icon 180 can be used to look at version n-i (where the "flashback" index, i, is user selectable). Alternately, the flashback index i can be a time (including date) entered by the user to retrieve a version filed at the specified time. The VTT software can review the filing time of previous versions and display the version with the filing time closest to the selected time. The VTT settings may be also be automatically determined by VTT software based on a user's past usage so that more likely settings are the default when a user drags a particular icon on top of the VTT icon 180.

It will be appreciated that the present invention, in the form of the VTT icon 180 (or one of the alternate embodiments described here) may be incorporated into an application toolbar, or may be globally integrated into a graphical operating system.

In addition to the VTT icon 180, a clock/calendar icon, a slider control, or other similar graphic time element can be included which can be manipulated by the user from within the VTT to allow the user to scan forward and backwards in time while looking at a data graph or other data display.

In another aspect of the invention, the VTT function can extend data or the contents of a file into the future by extrapolating data or contents from past and current versions. If the current version is n, then a future version, n+i, would be i extrapolations of previous activity (i being a "flashforward" index). Fractal art, digital servo systems, predictor-corrector solutions of differential equations, and the iterative solutions of two-point boundary value problems are some of many examples of applications for which such extrapolations can be useful. Additionally, many spreadsheets and financial programs currently in use already include the capability to make future predictions. The VTT provides an intuitive way to view and manipulate this data.

Extrapolation may be based on a linear or a parabolic determination of the rate of change. With reference to a first-order Taylor series, the following finite-difference equations are defined. A linear rate-of-change extrapolation to future time n+1 for spreadsheet database information having consistent time intervals (such as those presented by stock and commodity prices) is shown in eqn.(1) and a parabolic rate-of-change extrapolation to future time n+1 is shown in eqn.(2).

$$F(n+1)=2*F(n)-F(n-1) \qquad (1)$$

$$F(n+1) = \frac{5*F(n) - 4*F(n-1) + F(n-2)}{2} \qquad (2)$$

If the time intervals are not consistent, eqns.(3 and 4) are applicable for linear and parabolic rates of changes, respectively, where the varying time intervals are represented by t(i). In eqns.(1–4), the variable F represents each numerical cell of a spreadsheet; F(n+1) represents the next future value; F(n), the current value; F(n-1), the immediate previous value; and F(n-2), the next previous value. Time interval t(n+1) is the length of time between F(n+1) and F(n); t(n), the time between F(n) and F(n-1); and t(n-1), the time between F(n-1) and F(n-2). Extrapolations to future values beyond n+1 can, of course, also be made by making appropriate modifications to any of these equations.

$$F(n+1) = F(n) + \frac{F(n) - F(n-1)}{t(n)} * t(n+1) \qquad (3)$$

$$F(n+1) = F(n) + \frac{F(n) - F(n-1)}{t(n)} * t(n+1) + \qquad (4)$$
$$\frac{F(n) - F(n-2)}{t(n) + t(n-1)} * t(n+1) + \frac{F(n-1) - F(n-2)}{t(n-1)} * t(n+1)$$

Alternatives to extrapolation eqns.(1–4) exist. For example, truncated Fourier Series of spreadsheet data could be performed, cell by cell, as a function of time in order to identify cyclicity of the data, thus predicting the future value of each numerical cell in the spreadsheet based on its prior history and current value. A neural network could be taught the past i activities and then be used to extrapolate to a user-selected future time.

Use of eqns.(1–4) or other means of extrapolation is described with reference to the flow chart of FIG. 3. If the cursor 160 is placed over a source icon, step 320, then step 330 determines whether the icon has been selected and dragged to the VTT icon 180. If so, then in step 340 a list of extrapolating functions or future periods is displayed, one of which is selected in step 360 and the application, database, or other function represented by the source is extrapolated into the future and displayed in step 380.

Figure 4:
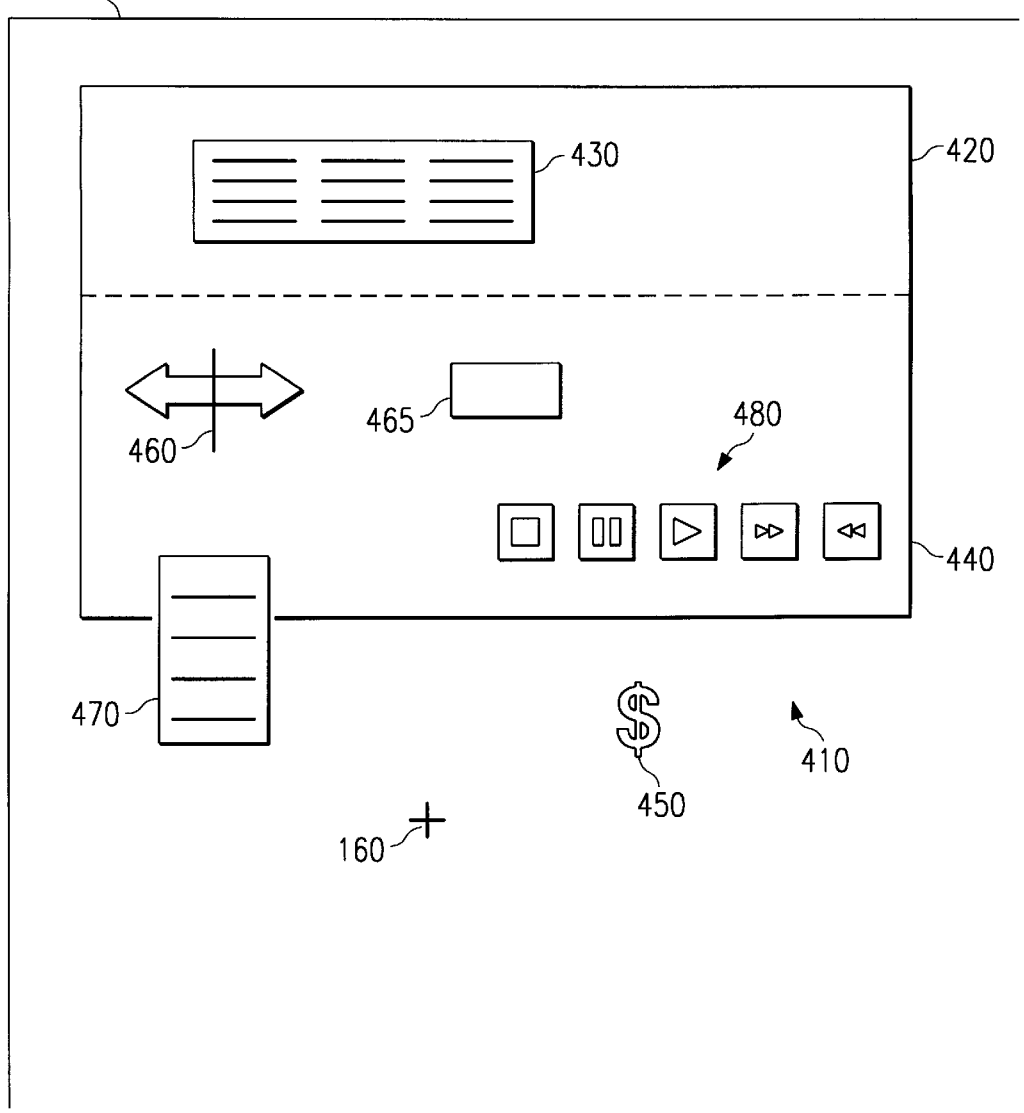
FIG. 4 is represents a portion of a display screen in which another embodiment of the present invention is incorporated.

FIG. 4, a representation of a portion of the monitor 130, illustrates another form of a VTT icon implemented as a window 410. The upper portion 420 of the window 410 comprises a "viewscreen" in which data or information 430 to be manipulated in time is viewed. The lower part 440 of the window 410 comprises a "control" area. An icon 450 representing the data or information to be analyzed may be dropped into the control area 440. A primary control 460 in the control area directs forward/backwards time movement, which may be varied on a linear or nonlinear scale and displayed in a window 465. A pop-up control panel 470 may be provided to modify other settings, such as time scale and graphing options. It will be appreciated that other methods of control and selection may be used. For example, the past version number, date or flashforward index i can be entered directly.

The time-varying data may be presented in the viewscreen 410 in several ways. In one embodiment, the data is presented as a "movie" or "slideshow", with the passage of time into the past or future represented graphically in the control area 440. The user can control the speed and direction of the presentation, as well as pause the presentation to examine any particular frame using standard play/pause/forward/reverse graphical icons 480.

In still another embodiment, the viewscreen represents a tunnel in perspective in which time is represented along the length of the tunnel. Snapshots of data to be represented are visible in panels along the walls of the tunnel, analogous to paintings hanging in a long hallway. The user can control apparent motion back and forth through the tunnel, and can stop and click on any panel to view it in detail. The relative time may be represented by wall color, perhaps green for current time, red for future time, and grey for the past (with color intensity varying with distance from the present). Different walls of the tunnel may be used to represent various aspects of the data presented. For instance, the right wall could be the current consumer price index, the left wall could be the current value of a 1995 dollar; and the far wall (end of the tunnel) could be used to plot the value of a parameter of particular interest, such as total net worth. Travel through the tunnel may be manually or automatically controlled. At a slow time speed, the side graphs appear to be rolling by and the user may stop and "look" at any time. Alternatively, only the "walls" can be made to appear to move and change color to indicate the passage of time while the graphs or other data remain stationary and update in place. Each graph would have a line or other indication of the original value (at time 0) for comparison and perhaps a setpoint/time-travel breakpoint.

While the invention has been particularly shown and described with reference to preferred embodiments thereof, it will be understood by those skilled in the art that various changes in form and details may be made therein without departing from the spirit and scope of the invention.

What is claimed is:

1. A method for accessing a data file from a plurality of versions of the data file residing on a storage device, comprising the steps of:
    displaying on a monitor a symbolic representation of the data file to be accessed;
    identifying the plurality of versions of the data file by moving the symbolic representation of data file to be accessed to a dedicated area of the monitor;
    selecting one of the plurality of versions of the data file to be accessed; and
    displaying the selected version of the data file on the monitor.

2. The method of claim 1, wherein the dedicated area comprises a virtual time tunnel icon and said identifying step comprises moving the symbolic representation onto the virtual time tunnel icon.

3. The method of claim 1, wherein said selecting step includes displaying a list of the plurality of versions of the data file.

4. The method of claim 1, wherein:
    said selecting step comprises entering a date and/or time; and
    said displaying step comprises displaying a version of the data file having a storage date and/or time closest to the entered date and/or time.

5. The method of claim 1, wherein:
    said selecting step comprises entering a flashback index i; and
    said displaying step comprises displaying a prior version n-i of the data file, where n represents the current version of the data file.

6. The method of claim 1, wherein:
    said identifying step comprises moving a virtual time tunnel icon to the symbolic representation of the data file to be accessed.

7. The method of claim 7, wherein:
    said selecting step comprises automatically selecting a version n-i of the data file, where n represents the current version of the data file and i represents a previously entered flashback index; and
    said displaying step comprises displaying the prior version n-i of the data file.

8. An article of manufacture for use in a computer system, said computer system including a processing unit for accessing a data file from a plurality of versions of the data file residing on a storage device,
    said article of manufacture comprising a computer-readable storage medium tangibly embodying a program of executable computer instructions which may cause said processing unit to execute steps of:
    displaying on a monitor a symbolic representation of the data file to be accessed;
    identifying the plurality of versions of the data file by moving the symbolic representation of the data file to be accessed to a dedicated area of the monitor;
    selecting one of the plurality of versions of the data file to be accessed; and
    displaying the selected version of the data file on the monitor.

9. The article of manufacture of claim 8, wherein said program of executable computer instructions may further cause said processing unit to execute wherein the dedicated area is a virtual time tunnel icon and said identifying step comprises moving the symbolic representation onto the virtual time tunnel icon.

10. The article of manufacture of claim 8, wherein said program of executable computer instructions may further cause said processing unit to execute wherein said selecting step includes displaying a list of the plurality of versions of the data file.

11. The article of manufacture of claim 8, wherein said program of executable computer instructions may further cause said processing unit to execute wherein:
    said selecting step comprises entering a date and/or time; and
    said displaying step comprises displaying a version of the data file having a storage date and/or time closest to the entered date and/or time.

12. The article of manufacture of claim 8, wherein said program of executable computer instructions may further cause said processing unit to execute wherein:
    said selecting step comprises entering a flashback index i; and
    said displaying step comprises displaying a prior version n-i of the data file, where n represents the current version of the data file.

13. The article of manufacture of claim 8, wherein said program of executable computer instructions may further cause said processing unit to execute wherein:
    said identifying step comprises moving a virtual time tunnel icon to the symbolic representation of the data file to be accessed.

14. The article of manufacture of claim 8, wherein said program of executable computer instructions may further cause said processing unit to execute wherein:

said selecting step comprises automatically selecting a version n-i of the data file, where n represents the current version of the data file and i represents a previously entered flashback index; and said displaying step comprises displaying the prior version n-i of the data file.

15. A computer system for accessing a data file from a plurality of versions of the data file, the versions residing on a storage device, comprising:

a display screen for displaying information, said display screen further having a target region;

an input device for selecting and/or moving information displayed within the display screen; and a processing unit coupled to the display screen and the input device, said processing unit identifying the plurality of versions of the data file on the display screen after said input device moves a symbolic representation of the data file into the target region of said display screen, wherein said input device then selects one of the plurality of versions of the data file identified by the processing unit, and said processing unit then causes the selected version of the data file to be displayed on said display screen.

16. The computer system of claim 15, wherein the target region of the display screen includes a virtual time transport icon.

17. The computer system of claim 15, wherein the target region comprises a dedicated area of the display screen.

18. The computer system of claim 15, wherein said processing unit identifies the plurality of versions of the data file by displaying a list of the plurality of versions, and said input device selects a selected version from the list.

19. The computer system of claim 15, wherein said input device selects one of the plurality of versions of the data file by entering a date and/or time, and said processing unit displays the version of the data file having a storage date and/or time closest to the entered date and/or time.

20. The computer system of claim 15, wherein said input device selects one of the plurality of versions of the data file by entering a flashback index i, and said processing unit displays a prior version n-i of the data file, where n represents a current version of the data file.

21. The computer system of claim 15, wherein said processing unit identifies the plurality of versions of the data file after said input device moves a virtual time transport icon to the symbolic representation of the data file to be accessed.

22. The computer system of claim 15, wherein the input device comprises a mouse.

\* \* \* \* \*